(No Model.)
D. H. COLE.
PLANT AND TREE PROTECTOR.
No. 342,582. Patented May 25, 1886.
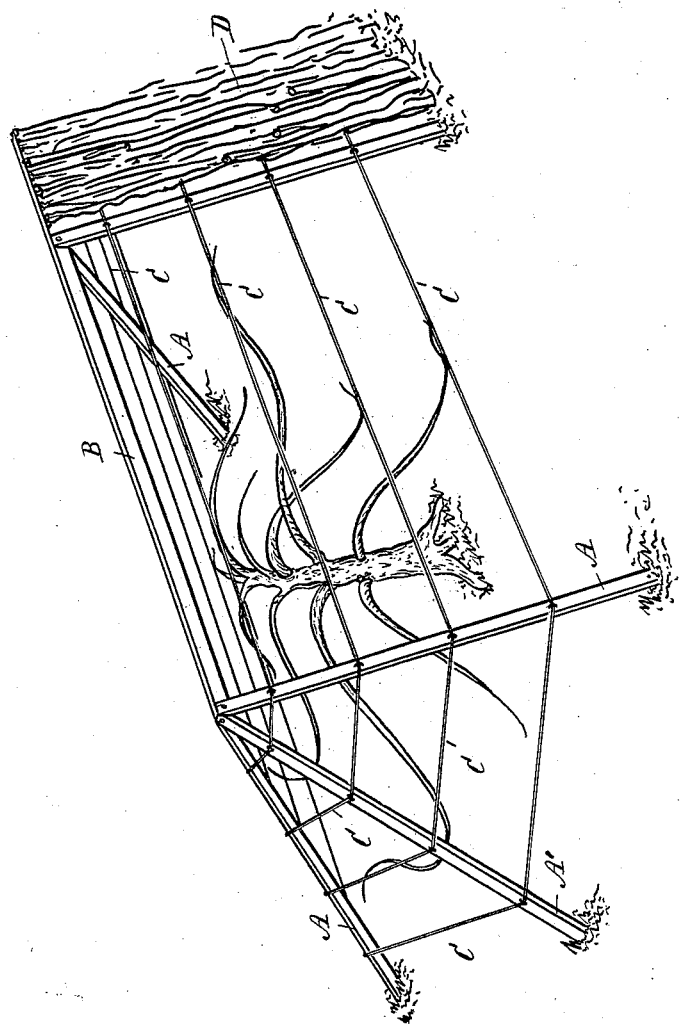
Attest:
John Schuman
Inventor:
Daniel H. Cole.
by his Atty

UNITED STATES PATENT OFFICE.

DANIEL H. COLE, OF MEMPHIS, MICHIGAN.

PLANT AND TREE PROTECTOR.

SPECIFICATION forming part of Letters Patent No. 342,582, dated May 25, 1886.

Application filed March 11, 1886. Serial No. 194,787. (No model.)

*To all whom it may concern:*

Be it known that I, DANIEL H. COLE, of Memphis, in the county of St. Clair and State of Michigan, have invented new and useful Improvements in Plant and Tree Protectors; and I do hereby declare that the following is a full, clear, and exact description thereof, reference being had to the accompanying drawing, which forms a part of this specification.

This invention relates to certain new and useful improvements in plant and tree protectors.

Fruit-trees, if allowed to grow without training to prevent, reach such an altitude that it is with difficulty and frequent danger to life and limb that the fruit at the top of the tree can be gathered in good condition. At times parts of the tree will be so overloaded with fruit as to break down unless propped up. Many trees, especially of a less hardy character than others, are killed by the severity of the winters of this climate, and it is a recognized fact in fruit-tree culture that quite extreme cold weather in the season when such weather is to be expected will not do serious damage to the trees unless such cold weather is accompanied by high winds, or if the trees are protected against such winds. The fruit in its incipient stages of growth is frequently destroyed by cold rains immediately followed by freezing weather, whereby the water in the buds is frozen.

The object of my invention is provide the means to obviate all the above difficulties; and the invention consists in the means hereinafter described.

In the accompanying drawing my invention is shown as applied and with a section of the covering or thatching removed, and A represents the rafters, and B the ridge-pole, the parts being so arranged as to form the frame of a roof having two long parallel sides and two shorter parallel ends, as shown, the ends being provided with the rafter A′, the upper end of which is rigidly secured to the ridge-pole B, as shown. These rafters are connected together by wire bars C, although wooden ones may be employed, if preferred. There are several of these rods running in horizontal parallel lines, and they are strongly secured to the rafters.

D is a removable thatching, which may be made from any handy flexible material, such as cornstalks, straw, &c. The lower ends of the rafters are inserted in the ground and the upper end secured to the ridge-pole, so as to surround a row of trees, as shown. The bars C are then secured in place. These bars should be strong enough to allow the operator to stand upon them to pick the fruit or to trim the tree, and with the rafters they form a trellis upon which to train the shoots and branches of the trees, which under my system of tree-culture should not be allowed to grow higher than the ridge-pole nor outside the frame-work to any extent. In severely cold and windy weather I cover this frame in whole or in part, as occasion may require, with a thatching or roof, which may again be removed and replaced, as the exigencies of the weather may demand.

I am aware that trellises for grape and other vines have been formed of a series of inclined rafters with supports for the upper ends of the same, and guy-wires and wires strung along the outside of the rafters, and do not claim such construction, broadly. I attach importance to the ridge-pole B, firmly bracing the rafters, and to the end rafter, A′, which serve not only as a brace, but also as a means for supporting the bars C, by means of which the operator can climb to the top of the rafter when he so desires. In this and the rigidity of the bars C, so as to bear the weight of the operator, lies the gist of my invention.

What I claim as my invention is—

The improved tree-protector described, consisting of the rafters A, end brace-rafter, A′, ridge pole B, uniting and bracing the upper ends of the said rafters, and the strong wire bars C, rigidly secured to said rafters A A′, and forming a support for the branches of a tree and as a ladder to support the weight of the operator, substantially as described.

DANIEL H. COLE.

Witnesses:
EZRA HAZEN,
JANE NORTH.